United States Patent
Baligh et al.

(10) Patent No.: US 10,644,777 B2
(45) Date of Patent: May 5, 2020

(54) CHANNEL STATE INFORMATION REFERENCE SIGNAL (CSI-RS) FOR LAYER-3 (L3) MOBILITY

(71) Applicant: Huawei Technologies Co., Ltd., Shenzhen (CN)

(72) Inventors: Mohammadhadi Baligh, Ottawa (CA); Kelvin Kar Kin Au, Kanata (CA); Keyvan Zarifi, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 113 days.

(21) Appl. No.: 15/821,210

(22) Filed: Nov. 22, 2017

(65) Prior Publication Data

US 2018/0323850 A1    Nov. 8, 2018

Related U.S. Application Data

(60) Provisional application No. 62/502,369, filed on May 5, 2017.

(51) Int. Cl.
*H04B 7/06* (2006.01)
*H04W 56/00* (2009.01)
(Continued)

(52) U.S. Cl.
CPC ........... *H04B 7/0626* (2013.01); *H04B 7/043* (2013.01); *H04B 7/0617* (2013.01); *H04W 56/003* (2013.01); *H04W 8/005* (2013.01)

(58) Field of Classification Search
CPC .... H04B 7/0626; H04B 7/043; H04B 7/0617; H04W 56/003; H04W 8/005
See application file for complete search history.

(56) References Cited

U.S. PATENT DOCUMENTS

| | | | |
|---|---|---|---|
| 2015/0092768 A1 | 4/2015 | Ng et al. | |
| 2015/0208269 A1* | 7/2015 | Damnjanovic | H04L 1/0026 370/252 |

(Continued)

FOREIGN PATENT DOCUMENTS

| | | |
|---|---|---|
| CN | 105580297 A | 5/2016 |
| CN | 106537964 A | 3/2017 |
| WO | 2016126099 A1 | 8/2016 |

OTHER PUBLICATIONS

Ericsson, "Additional RS for connected mode mobility", 3GPP TSG-RAN WG1 Meeting #88, R1-1702129, Feb. 13-17, 2017, 3 Pages, Athens, Greece.

(Continued)

*Primary Examiner* — Walter J Divito
*Assistant Examiner* — Anthony Luo
(74) *Attorney, Agent, or Firm* — Slater Matsil, LLP

(57) ABSTRACT

A system and method for communicating channel state information reference signal (CSI-RS) in a communication network. A cell such as an eNodeB (eNB) or a transmit-receive-point (TRP) may transmit to a user equipment (UE) one or more synchronization signal (SS) blocks according to one or more beam directions available to the cell. Each beam direction may correspond to one or more antenna ports, and each SS block may correspond to an SS index. The cell may then transmit a CSI-RS signal configured according to the one or more antenna ports and the one or more SS blocks. In a different embodiment, the cell may select antenna ports of a neighbor cell for the CSI-RS signal based on a channel state measurement report of the neighbor cell received from the UE.

18 Claims, 15 Drawing Sheets

(51) Int. Cl.
*H04B 7/0426* (2017.01)
*H04W 8/00* (2009.01)

(56) References Cited

U.S. PATENT DOCUMENTS

| | | |
|---|---|---|
| 2015/0223149 A1 | 8/2015 | Liu et al. |
| 2017/0078062 A1 | 3/2017 | Park et al. |
| 2017/0201898 A1* | 7/2017 | Park ...................... H04W 16/32 |
| 2018/0034525 A1 | 2/2018 | Park et al. |
| 2018/0234912 A1* | 8/2018 | Islam ................ H04W 36/0072 |
| 2018/0262313 A1* | 9/2018 | Nam .................... H04L 5/0053 |
| 2018/0269950 A1* | 9/2018 | Wilson .................. H04L 5/0053 |
| 2018/0288755 A1* | 10/2018 | Liu ......................... H04L 5/005 |
| 2018/0324716 A1* | 11/2018 | Jeon ..................... H04W 52/50 |
| 2018/0343595 A1* | 11/2018 | da Silva ............... H04J 11/0073 |

OTHER PUBLICATIONS

LG Electronics, "Discussion on QCL for NR", 3GPP TSG RAN WG1 Meeting #88, R1-1702466, Feb. 13-17, 2017, 3 Pages, Athens, Greece.

LG Electronics, "Discussion on RRM measurement in NR", 3GPP TSG RAN WG1 Meeting #88bis, R1-1704870, Apr. 3-7, 2017, 4 Pages, Spokane, USA.

LG Electronics, "Discussion on QCL for NR", 3GPP TSG RAN WG1 Meeting #88bis, R1-1704893, Apr. 3-7, 2017, 2 Pages, Spokane, USA.

NTT Docomo, Inc. "Further views on mechanism to recover from beam failure", 3GPP TSG RAN WG1 Meeting #88bis, R1-1705719, Apr. 3-7, 2017, 5 Pages, Spokane, USA.

* cited by examiner

CHANNEL STATE INFORMATION REFERENCE SIGNAL (CSI-RS) FOR LAYER-3 (L3) MOBILITY

This application claims priority to U.S. Provisional Patent Application 62/502,369 filed on May 5, 2017 and entitled "Channel State Information Reference Signal (CSI-RS) for Layer-3 (L3) Mobility," which is incorporated herein by reference as if reproduced in its entirety.

TECHNICAL FIELD

The present disclosure relates generally to managing the allocation of resources in a network, and in particular embodiments, to techniques and mechanisms for channel state information reference signal (CSI-RS) for layer-3 (L3) mobility.

BACKGROUND

Wireless signals communicated at high carrier frequencies, such as millimeter Wave (mmW) signals, tend to exhibit high free-space path loss. To compensate for high path loss rates, high-frequency communications may use beamforming at both the base station and user equipment (UE). Beam management techniques may be used to identify, or otherwise discover, beam directions to use for initial data transmission/reception, as well as to adapt, or otherwise update, beam directions as the spatial characteristics of the air interface change due to, for example, UE mobility.

SUMMARY

Technical advantages are generally achieved, by embodiments of this disclosure which describe channel state information reference signal (CSI-RS) for layer-3 (L3) mobility.

In accordance with an embodiment, a method comprising for providing channel feedback is provided. In this example, the method includes receiving a synchronization signal (SS) block from a base station, and receiving a channel state information reference signal (CSI-RS) from the base station. The CSI-RS is quasi-co-located (QCL'd) with the SS block. In one example, the CSI-RS is QCL'd with the SS block such that large-scale properties of a channel associated with the CSI-RS can be inferred from the SS block. In such an example, the large-scale properties may include one or more of delay spread, Doppler spread, Doppler shift, average gain, spatial correlation, and average delay. In the same example, or in another example, the method further includes estimating CSI information based on the CSI-RS and based on properties of the SS block that are QCL'd with the CSI-RS. An apparatus for performing this method is also provided.

In accordance with another embodiment, a method for communicating a channel state information reference signal (CSI-RS) in a communication network is provided. In this example, the method includes receiving, an indication from a serving base station that identifies a CSI-RS configuration of a neighboring base station, receiving one or more beamformed synchronization signal (SS) blocks from the neighboring base station, and monitoring one or more downlink channels for beamformed CSI-RSs of the neighboring base station in accordance with a subset of CSI-RS antenna ports. The subset of CSI-RS antenna ports are selected from a set of CSI-RS antenna ports based on the one or more beamformed SS blocks and the CSI-RS configuration of the neighboring base station. In one example, each of the one or more SS blocks are associated with a subset of CSI-RS antenna ports, and each of the beamformed CSI-RSs is transmitted over a specific CSI-RS antenna port in the subset of CSI-RS antenna ports. In that example, or another example, the subset of CSI-RS antenna ports includes fewer than all CSI-RS antenna ports of the neighboring base station. In any one of the above mentioned examples, or in another example, the UE receives the control signal indicating the CSI-RS configuration of the neighboring base station prior to receiving the one or more SS blocks from the neighboring base station. In any one of the above mentioned examples, or in another example, the method further comprises sending a request for the CSI-RS configuration of the neighboring base station to the serving base station after receiving the one or more SS blocks from the neighboring base station. The indication of the CSI-RS configuration of the neighboring base station is received from the serving base station in response to sending the request for the CSI-RS configuration of the neighboring base station to the serving base station. In any one of the above mentioned examples, or in another example, the indication identifying the CSI-RS configuration of the neighboring base station signal is received in a radio resource configuration (RRC) message. In any one of the above mentioned examples, or in another example, each of the one or more SS blocks is mapped to one or more CSI-RS antenna ports. An apparatus for performing this method is also provided.

In accordance with yet another embodiment, a method for notifying users of channel state information reference signal (CSI-RS) configurations of neighboring cells in a communication network is provided. In this embodiment, the method includes receiving an indication from a served user equipment (UE) that the served UE has received a synchronization signal (SS) block from a neighboring base station, and transmitting a control signal indicating a CSI-RS configuration of the neighboring base station to the served user equipment (UE) in response to receiving the indication that the served UE has received the SS block from the neighboring base station. In one example, the indication identifying the CSI-RS configuration of the neighboring base station signal is received in a radio resource configuration (RRC) message. In the same example, or another example, the SS block is mapped to a subset of CSI-RS antenna ports of the neighboring base station. In such an example, the subset of CSI-RS antenna ports may include fewer than all CSI-RS antenna ports of the neighboring base station. An apparatus for performing this method is also provided.

In accordance with yet another embodiment, a method for notifying users of channel state information reference signal (CSI-RS) configurations of neighboring cells in a communication network is provided. In this embodiment, the method includes receiving an indication from a serving base station that a served UE has received a synchronization signal (SS) block from the target base station, configuring CSI-RS antenna ports of a target base station based on a coarse beam direction used to transmit the detected SS block, and transmitting CSI-RS symbols over the CSI-RS antenna ports. The CSI-RS antenna ports are quasi-co-located (QCL) with an antenna port used to transmit the SS block. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
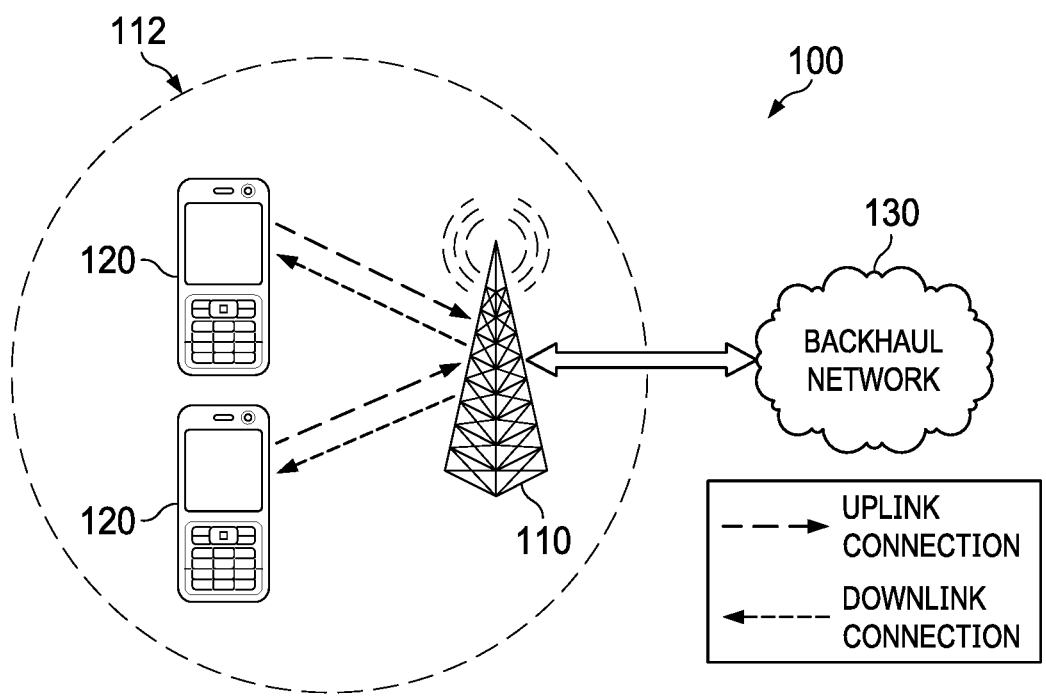
FIG. 1 is a diagram of an embodiment network for communicating data.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As used herein, the term "beam direction" refers to a radio antenna pattern, or set of beamforming weights, that is used for directional signal transmission and/or reception. The terms "beam directions" and "beams" are used interchangeably herein. As used herein, the term "coarse beams" and "fine beams" are relative terms referring to be beam-width of a given beam, which coarse beams generally having wider beam-widths than fine beams.

In general, a base station may broadcast synchronization signal (SS) blocks that include synchronization and cell-specific information for accessing a cell associated with the base station. The SS blocks may include a primary synchronization signal (PSS), a secondary synchronization signal (SSS), and a physical broadcast channel (PBCH). The PSS and SSS may include synchronization signaling as well as information for decoding the PBCH, such as a cell identifier (ID). The PBCH may indicate transmission parameters that are to be used for initial cell access, including the downlink system bandwidth, physical hybrid automatic repeat request (HARQ) channel structure, system frame number, and/or antenna ports used by the cell. After decoding the PBCH, the UE will generally monitor downlink channel(s) for channel state information reference signals (CSI-RSs) in accordance with resource locations associated with antenna-ports identified by the CSI-RS configuration for either the serving cell and/or one or more neighboring cells for example for layer-3 mobility purposes. Upon detecting the CSI-RSs, the UE may generate channel quality information (CQI), which is then fed-back to the base station and used to select transmission parameters during link establishment.

While embodiments of the present disclosure are applicable to layer-3 mobility in some implementations, such embodiments may also be applicable, more generally, to communications between a UE and a single base station or cell in other implementations. For example, embodiments of the present disclosure may be implemented to improve beam tracking between a UE and a single base station or cell. As another example, embodiments of the present disclosure may be implemented to select a TRP and/or beam within a cell.

In high-frequency networks, such as mmW networks, SS block and CSI-RS transmissions may also be used for beam-scanning in order to determine which beams should be used for link establishment. In one example, a base station may use different coarse beam directions to transmit SS blocks during different time-intervals in a sequence of time-intervals, as well as use different fine beams to perform CSI-RS transmissions over different antenna ports. In such an example, each coarse beam used to transmit a corresponding SS block may be associated with a subset of fine beams used to perform corresponding CSI-RS transmissions. In this way, a UE wishing to access the cell may first monitor a broadcast channel to detect SS block(s) having the highest reference signal received power (RSRP) and/or reference signal received quality (RSRQ) levels at the spatial location of the UE, and then monitor a corresponding subset of antenna ports to detect corresponding CSI-RS transmissions. The subset of CSI-RS antenna ports may have been selected from a set of CSI-RS antenna ports based on the one or more beamformed SS blocks and the CSI-RS configuration of the neighboring base station. For example, the subset of fine beams may correspond to a subset of CSI-RS antenna ports, which correspond to a coarse beam used to transmit the SS block. As used herein, an "antenna port" is generally used in a manner that is consistent with the third generation partnership project (3GPP) family of standard telecommunication protocols such as Long Term Evolution (LTE), and refers to a set of resource elements over which a reference signal sequence is transmitted. Thus, different antenna ports may be mapped to different combinations of overlapping, or non-overlapping, sets of resource elements in the physical downlink shared channel of a subframe.

Embodiments of this disclosure transmit SS blocks and CSI-RSs over quasi-co-located (QCL) antenna ports. Two antenna ports are said to be quasi co-located if large-scale properties of a channel associated with one antenna port can be inferred from a reference signal received over the other antenna port. The large-scale properties include one or more of delay spread, Doppler spread, Doppler shift, average gain, spatial correlation and average delay. In one example, a UE may estimate CSI information (e.g., digital precoding matrix indicator (PMI), channel quality indicator (CQI), antenna rank, etc.) based on reference signals received over the beam-scanning subsection of a subframe. More specifically, the estimate may be based on the CSI-RS and on properties of the SS block that are QCL with the CSI-RS.

Embodiments of this disclosure also provide techniques for dynamically notifying UEs of CSI-RS configurations of neighboring cells. More specifically, embodiments of this disclosure communicate a control signal to UEs that indicates when an antenna port of a target base station is quasi-co-located with a CSI-RS antenna port of the target base station. Additionally, a control signal indicating a CSI-RS configuration of the target base station may be sent to the UEs, and the UEs may select a subset of CSI-RS antenna ports over which to receive CSI-RS signals based on detected SS blocks and the CSI-RS configurations of the target base station. These and other inventive aspects are described in greater detail below.

FIG. 1 illustrates a network 100 for communicating data. The network 100 comprises a base station no having a coverage area 101, a plurality of user equipments (UEs) 120, and a backhaul network 130. As shown, the base station no establishes uplink (dashed line) and/or downlink (dotted line) connections with the UEs 120, which serve to carry data from the UEs 120 to the base station no and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an evolved NodeB (eNodeB or eNB) or a gNB, a transmit/receive point (TRP), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "user equipment (UE)" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
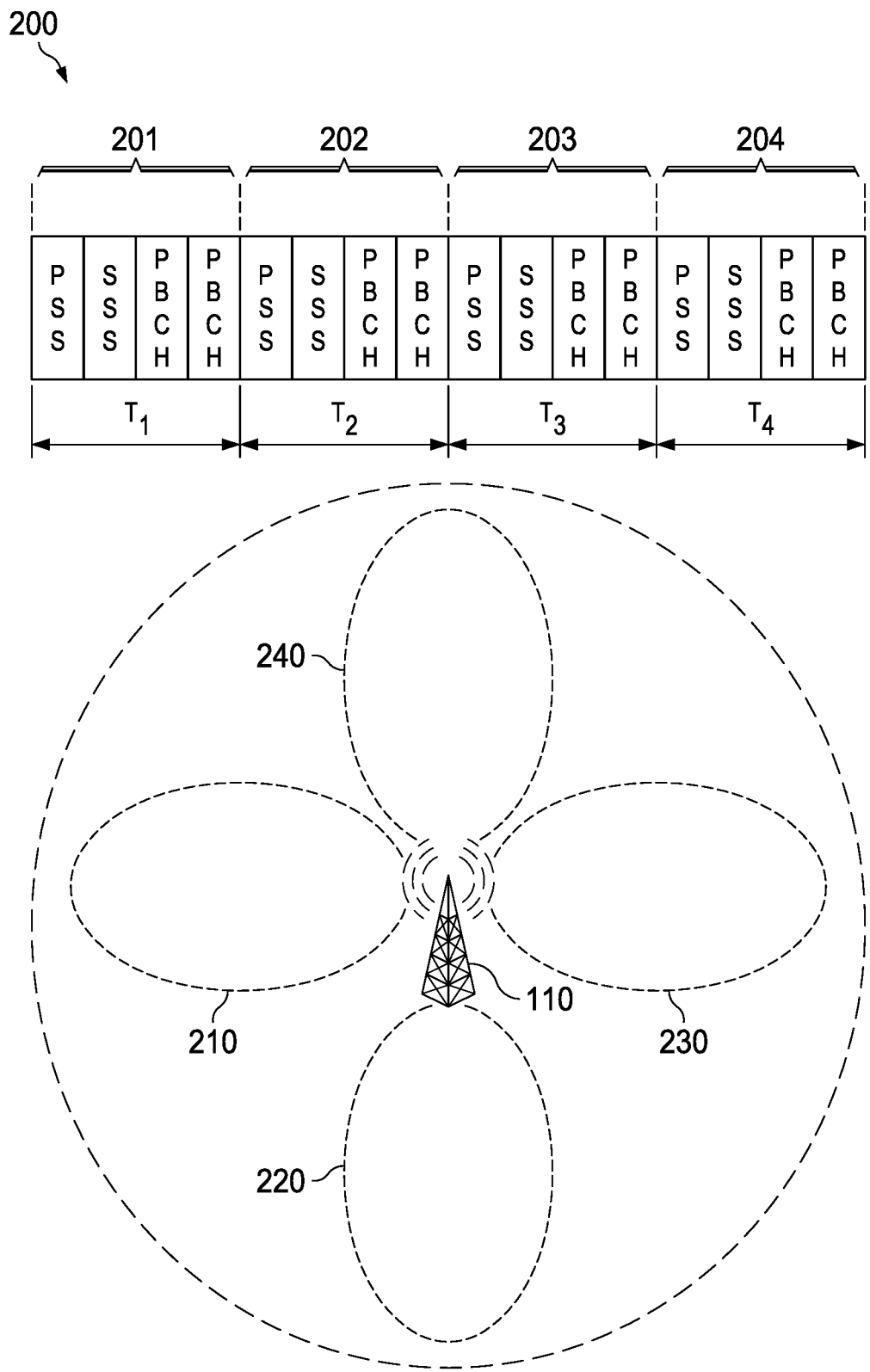
FIG. 2 is a diagram of a directional SS block transmission scheme.

In high-frequency networks, base stations may use different beams to transmit SS blocks over different time intervals in a sequence of periodic time-intervals. FIG. 2 is a diagram of a directional SS block transmission scheme 200. In this example, the base station no uses coarse beams 210-240 to transmits SS blocks 201-204 over a sequence of time intervals (i.e., t1-t4). In particular, the base station 210 uses the beam 210 to transmit the SS block 201 in a first time interval (t1), the beam 220 to transmit the SS block 202 in a second time interval (t2), the beam 230 to transmit the SS block 203 in a third time interval (t3), and the beam 240 to transmit the SS block 204 in a fourth time interval (t4). In this example, each of the SS blocks 201-204 includes a PSS, a SSS, and two PBCHs. In other examples, SS blocks may include different types of synchronization signals and/or different numbers of PBCHs (e.g., a PSS and one PBCH, etc.).

Figure 3:
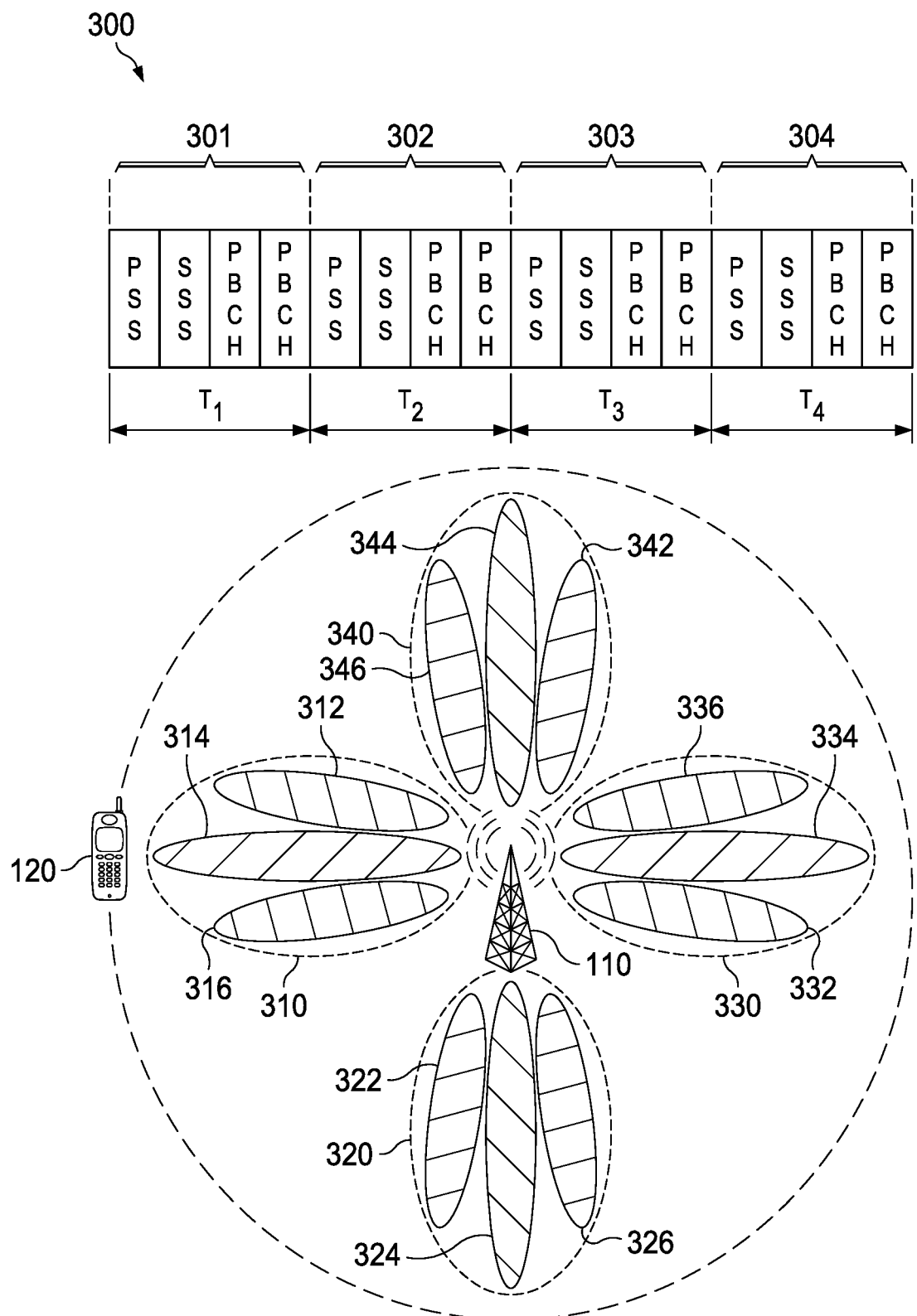
FIG. 3 is a diagram of a transmission scheme for communicating an SS block and CSI-RS symbols over quasi-co-located (QCL) antenna ports.

In some embodiments, an SS block and one or more CSI-RSs may be transmitted over antenna ports that are quasi-co-located. FIG. 3 is a diagram of a transmission scheme 300 for transmitting an SS block and a subset of CSI-RSs over quasi-co-located antenna ports. As shown, the base station no uses coarse beams 310-340 to transmit SS blocks 201-204 over a sequence of time intervals (i.e., t1-t4), and fine beams 312-316, 322-326, 332-336, and 342-346 to transmit CSI-RS symbols. The fine beams 312-316 are transmitted over antenna ports that are quasi-co-located with the antenna port associated with the coarse beam 310, The fine beams 322-326 are transmitted over antenna ports that are quasi-co-located with the antenna port associated with the coarse beam 320, the fine beams 332-336 are transmitted over antenna ports that are quasi-co-located with the antenna port associated with the coarse beam 330, and the fine beams 342-346 are transmitted over antenna ports that are quasi-co-located with the coarse beam 340.

Figure 4:
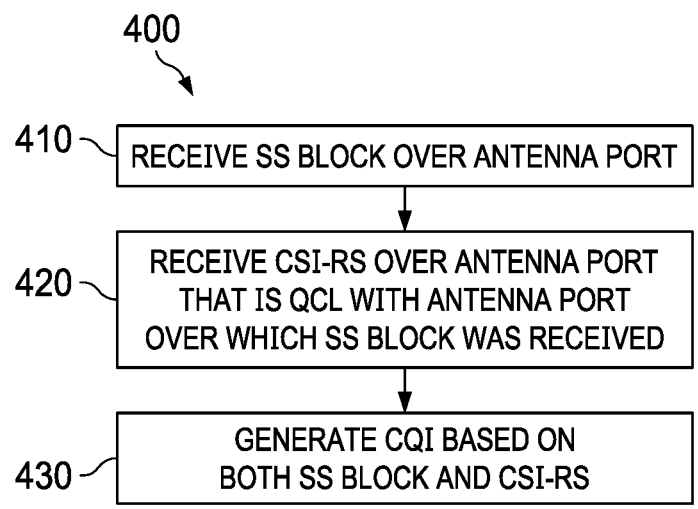
FIG. 4 is a flowchart of an embodiment beam-tracking method.

FIG. 4 is a flowchart of an embodiment method 400 for beam-tracking, as may be performed by a UE. At step 410, the UE receives an SS block over an antenna port. At step 420, the UE receives a CSI-RS symbol over an antenna port that is QCL with the antenna port over which SS block was received. At step 430, the UE generates channel quality information (CQI) based on both SS block and CSI-RS symbol.

Figure 5A:
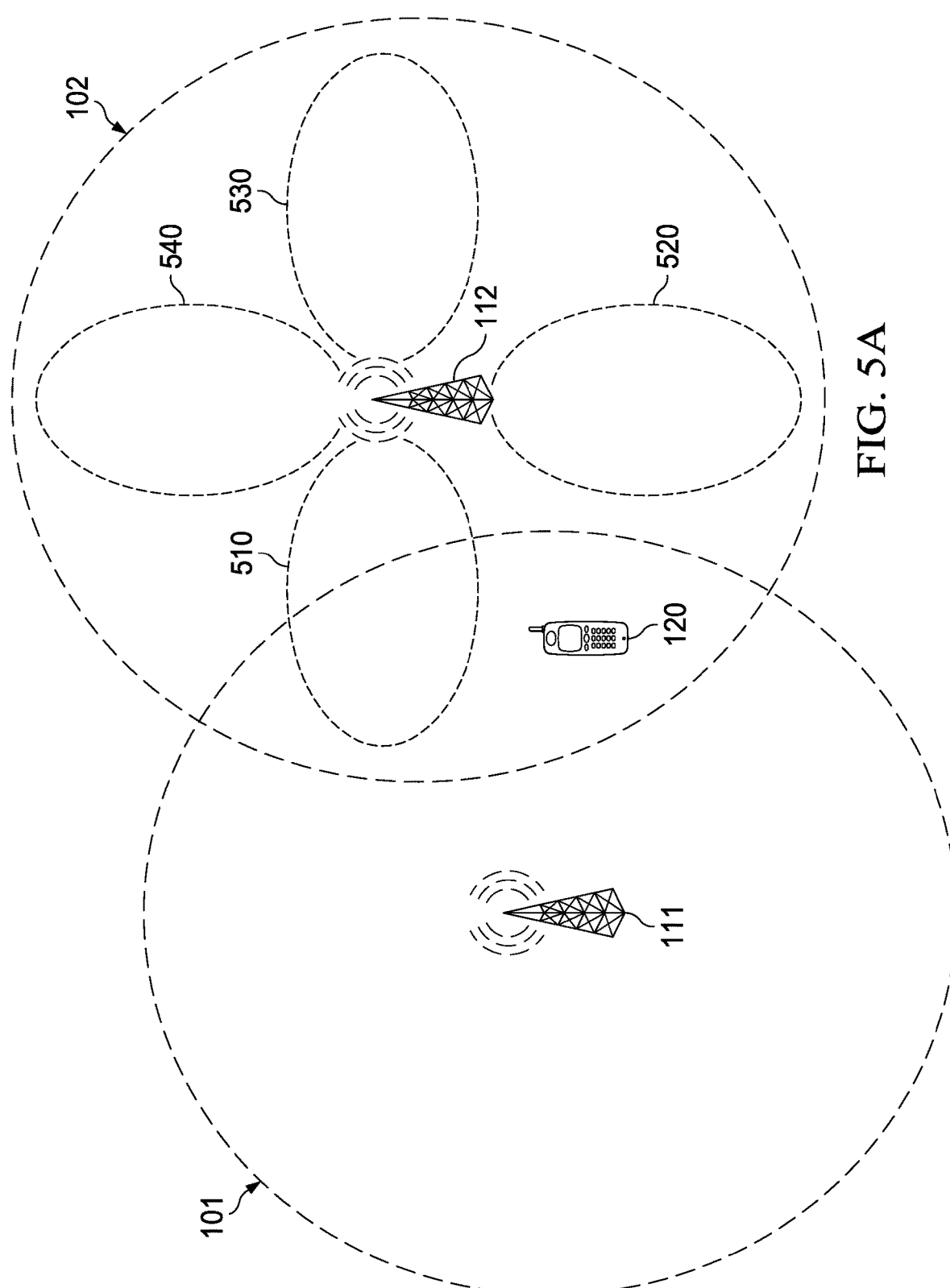
FIGS. 5A-5B are diagrams for implementing an embodiment beam-tracking technique during a handover.
Figure 5B:
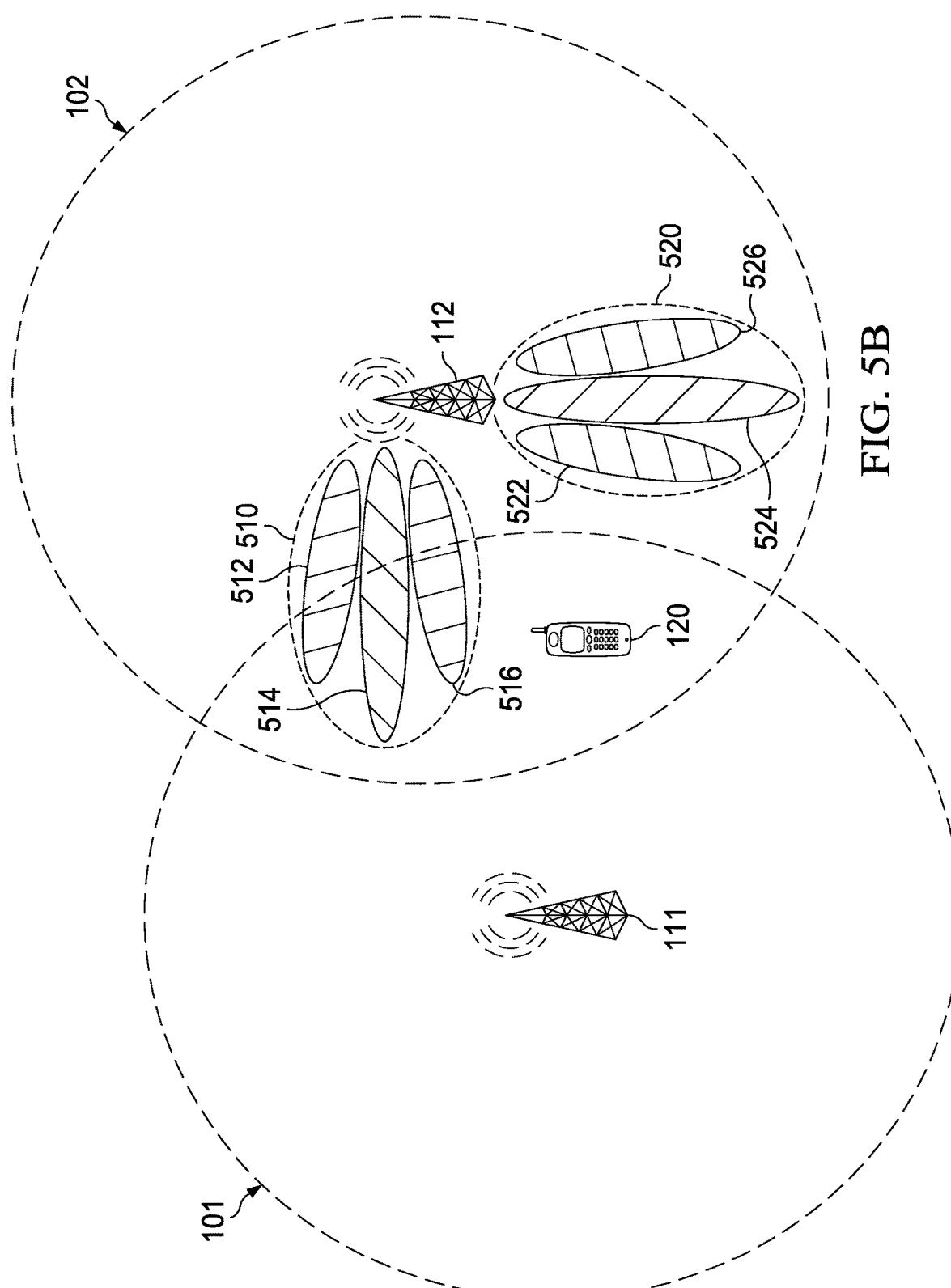

In some situations, beam-tracking may be used during a handover from a source base station to a target base station. FIGS. 5A-5B are diagrams of beam-tracking techniques used during a handover of a UE 120 from a source base station 111 to a target base station 112. As shown in FIG. 5A, the UE 120 migrates from a cell 101 of the serving base station 111 to a cell 102 of the target base station 112, at which time the UE 120 detects one or more SS block transmissions from the target base station 112. In this example, the UE 120 detects SS block transmissions over the coarse beams 510, 520.

Upon detecting the SS block transmissions, the UE 120 may notify the serving BS 111 of information corresponding to the detected SS blocks, such as which timeslots the detection occurred. The serving base station may then send a CSI-RS configuration request to the target base station 112. In some embodiments, the UE 120 notifies the serving base station 111 and/or target base station 112 which SS blocks were detected, and the target base station 112 dynamically configures the CSI-RS antenna ports such that CSI-RS symbols are transmitted over fine beams 512-516 and 522-526 associated with coarse beams used to transmit the SS blocks.

Figure 6:
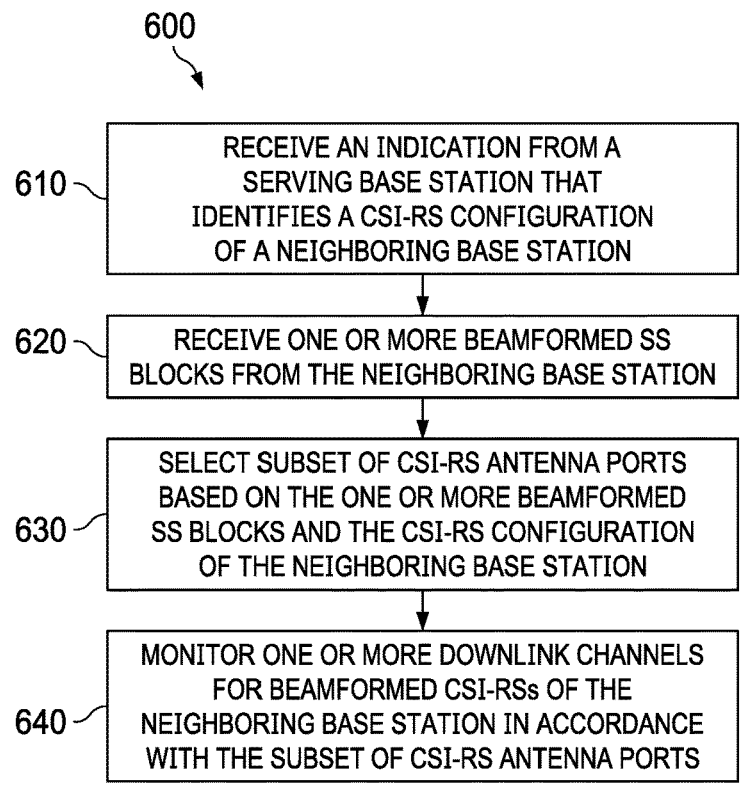
FIG. 6 is a flowchart of an embodiment beam-tracking method.

FIG. 6 is a flowchart of an embodiment method 600 for beam-tracking, as may be performed by a UE. At step 610, the UE receives an indication from a serving base station that identifies a CSI-RS configuration of a neighboring base station. At step 620, the UE receives one or more SS blocks from the neighboring base station. At step 630, the UE selects a subset of CSI-RS antenna ports based on the one or more SS blocks. At step 640, the UE monitors one or more downlink channels for beamformed CSI-RSs of the neighboring base station in accordance with the subset of CSI-RS antenna ports.

Figure 7:
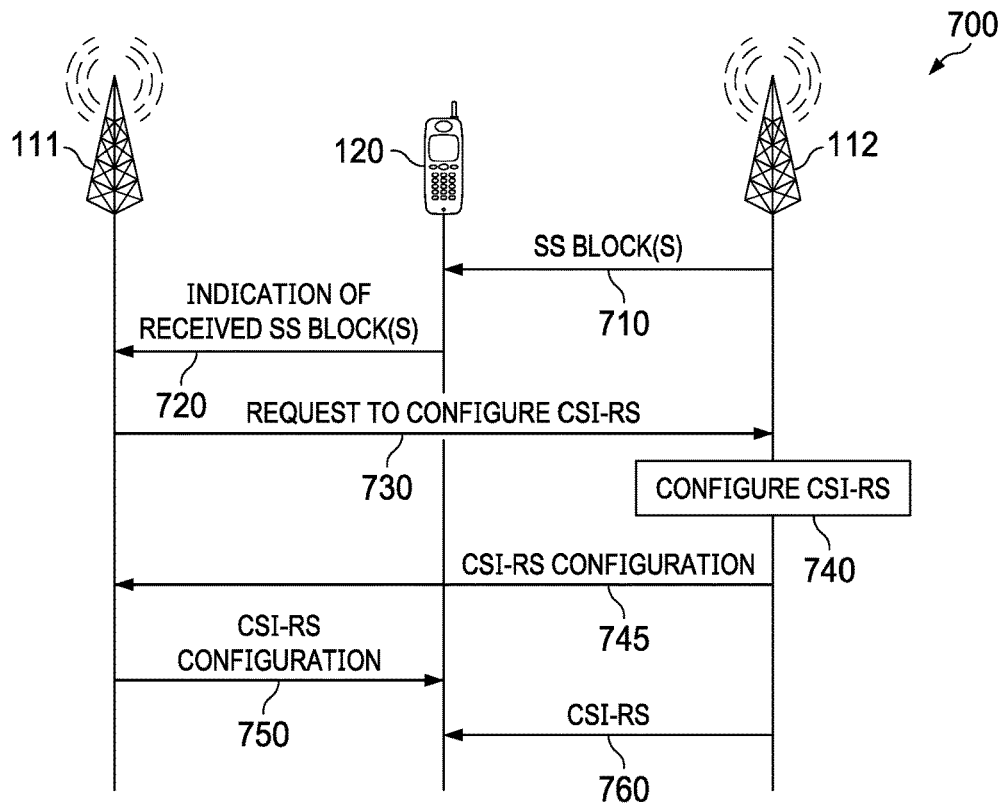
FIG. 7 is a protocol diagram of an embodiment beam-tracking communications sequence.
Figure 8:
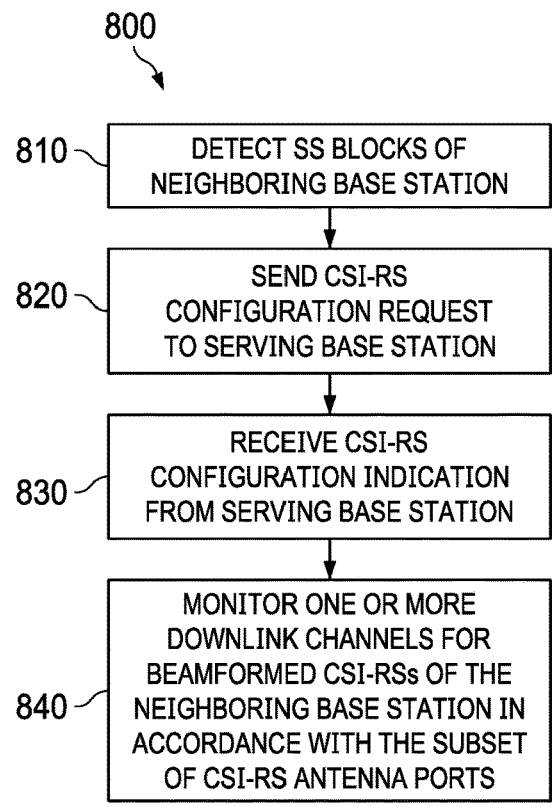
FIG. 8 is a flowchart of an embodiment beam-tracking method.

FIG. 7 is a protocol diagram of an embodiment communications sequence 700 for beam-tracking. In this example, the UE 120 detects the SS block 710, and sends an indication of the detected SS block 720 to the serving base station 111. The serving base station in sends a CSI-RS configuration request 730 to the target base station 112, which prompts the target base station 112 to configure CSI-RS antenna ports at step 740. The target base station 112 then returns a CSI-RS configuration acknowledgment 745 to the source base station in, which sends a notification 750 to the UE 120 prompting the UE to monitors one or more downlink channels for beamformed CSI-RSs of the neighboring base station in accordance with the subset of CSI-RS antenna ports FIG. 8 is a flowchart of an embodiment method 800 for triggering dynamic configuration of CSI-RS antenna ports, as may be performed by a UE. At step 810, the UE detects SS blocks of a neighboring base station. At step 820, the UE sends a CSI-RS configuration request to a serving base station. At step 830, the UE receives a CSI-RS configuration indication from the serving base station. At step 840, the UE monitors one or more downlink channels for beamformed CSI-RSs of the neighboring base station in accordance with the CSI-RS configuration of the neighboring base station.

Figure 9:
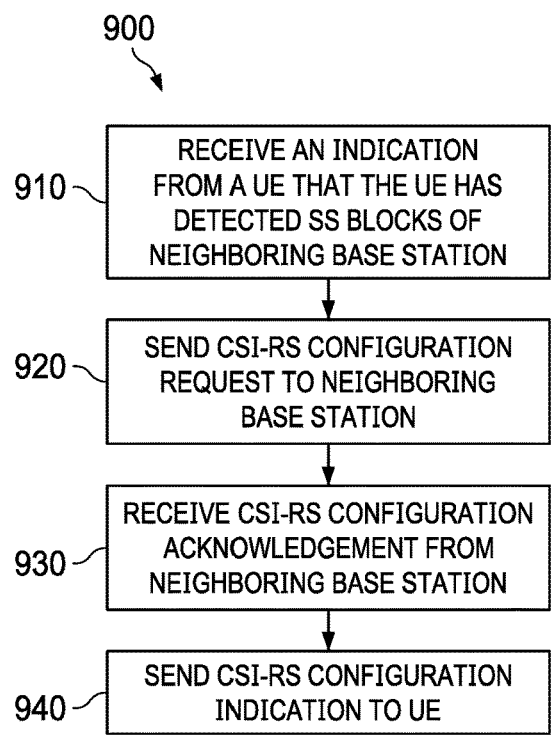
FIG. 9 is a flowchart of another embodiment beam-tracking method.

FIG. 9 is a flowchart of an embodiment method 900 for triggering dynamic configuration of CSI-RS antenna ports, as may be performed by a serving base station. At step 910, the serving base station receives an indication from a UE that has detected an SS block of a neighboring base station. At step 920, the serving base station sends a CSI-RS configuration request to the neighboring base station. At step 930, the serving base station receives a CSI-RS configuration acknowledgment from the neighboring base station. At step 940, the serving base station sends a CSI-RS configuration indication to the UE, which triggers the UE to monitor one or more downlink channels for beamformed CSI-RSs of the neighboring base station in accordance with CSI-RS antenna ports.

Figure 10:
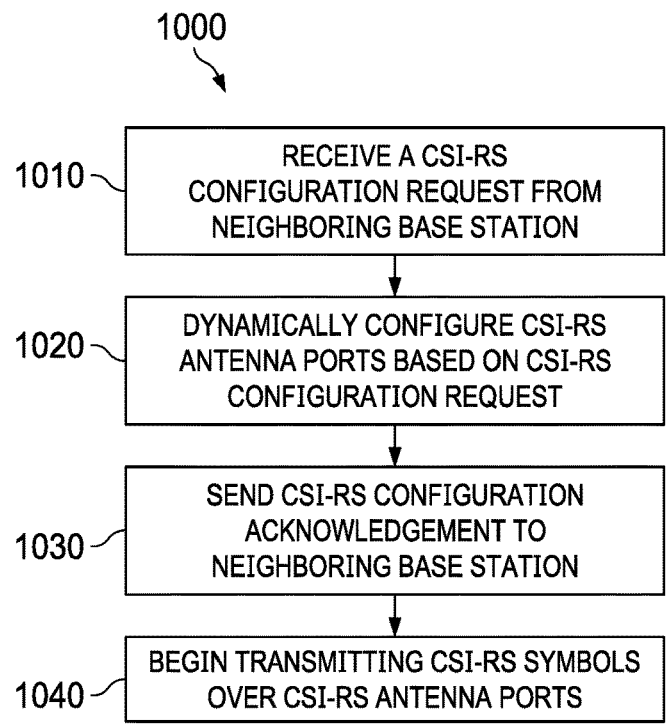
FIG. 10 is a flowchart of an embodiment beam-tracking method.

FIG. 10 is a flowchart of an embodiment method 1000 for dynamically configuring CSI-RS antenna ports of a target base station. At step 1010, the target base station receives a CSI-RS configuration request from a serving base station. At step 1020, the target base dynamically configures CSI-RS antenna ports based on the CSI-RS configuration request. At step 1030, the target base sends a CSI-RS configuration acknowledgment to the serving base station. At step 1040, the target base begins transmitting CSI-RS symbols over CSI-RS antenna ports in accordance with the dynamic CSI-RS configuration.

Figure 11:
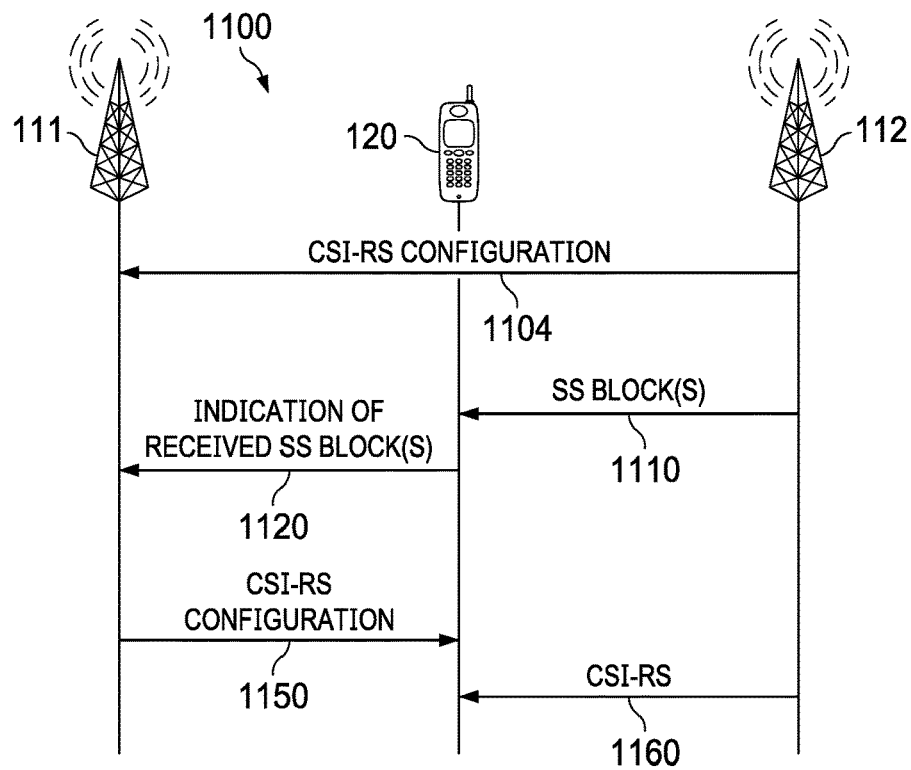
FIG. 11 is a protocol diagram of an embodiment beam-tracking communications sequence.

FIG. 11 is a protocol diagram of an embodiment communications sequence 1100 for beam-tracking. In this example, the serving base station 111 receives a CSI-RS configuration indication 1104 from a target base station 112. Thereafter, the UE 120 detects SS blocks 1110 transmitted by the target base station 112, and sends an indication of the detected SS block 1120 to the serving base station 111. The serving base station 111 sends a CSI-RS configuration indication 1150 to the UE, and UE 120 begins receiving CSI-RS 1160 symbols from the target base station according to the CSI-RS configuration indication 1150.

Figure 12:
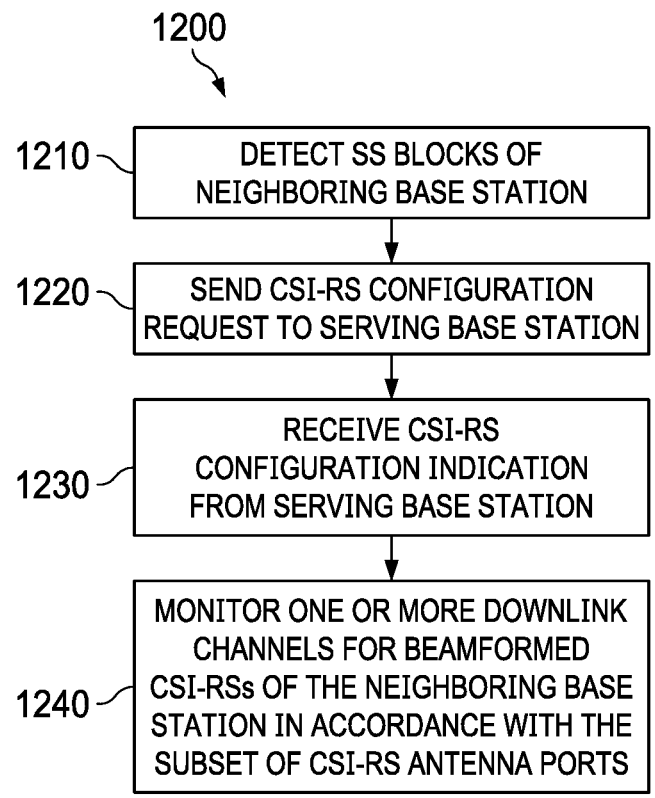
FIG. 12 is a flowchart of an embodiment beam-tracking method.

FIG. 12 is a flowchart of an embodiment method 1200 for dynamic beam-tracking, as may be performed by a UE. At step 1210, the UE detects SS blocks of neighboring base station. At step 1220, the UE sends a CSI-RS configuration request to the serving base station. At step 1230, the UE receives a CSI-RS configuration indication from the serving base station. At step 1240, the UE monitors one or more downlink channels for beamformed CSI-RSs of the neighboring base station in accordance with the subset of CSI-RS antenna ports.

Figure 13:
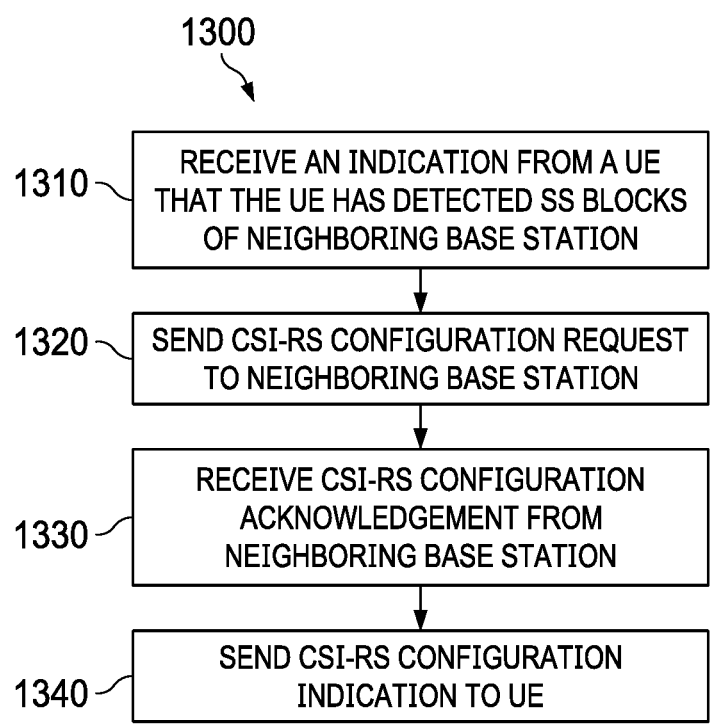
FIG. 13 is a flowchart of an embodiment beam-tracking method.

FIG. 13 is a flowchart of an embodiment method 1300 for dynamically configuring CSI-RS antenna ports, as may be performed by a serving base station. At step 1310, the serving base station receives an indication that a UE has detected SS blocks of neighboring base station. At step 1320, the serving base station sends a CSI-RS configuration request to the neighboring base station. At step 1330, the serving base station receives a CSI-RS configuration indication from the target base station. At step 1340, the serving base station sends the CSI-RS configuration indication to the UE, thereby triggering the UE to monitor one or more downlink channels for beamformed CSI-RSs of the neighboring base station in accordance with CSI-RS antenna ports.

Figure 14:
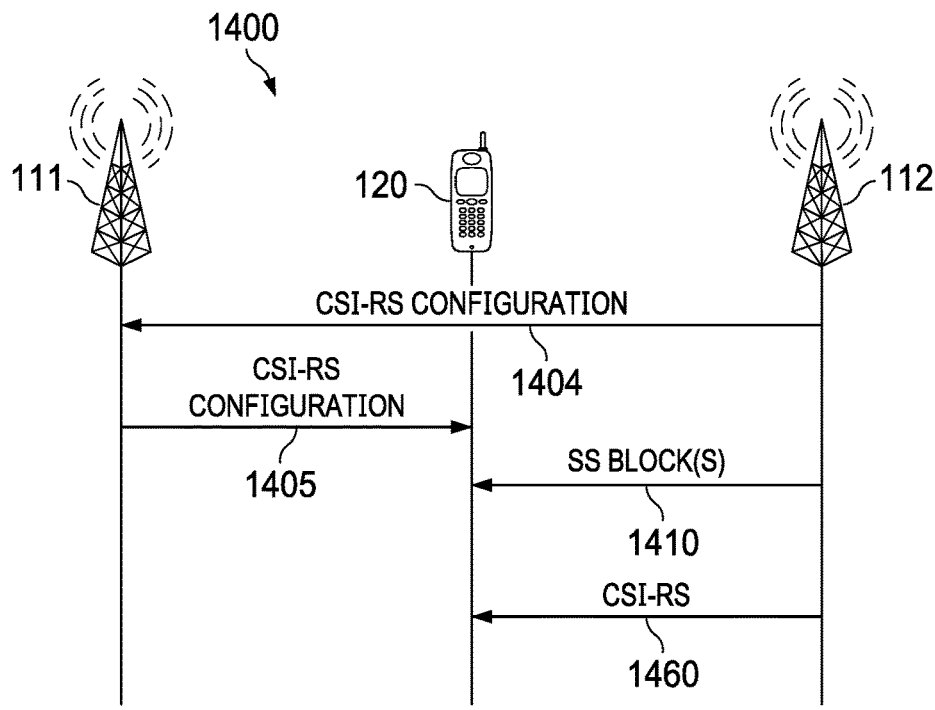
FIG. 14 is a protocol diagram of an embodiment beam-tracking communications sequence.

FIG. 14 is a protocol diagram of an embodiment communications sequence 1400 for beam-tracking. In this example, the serving base station 111 receives a CSI-RS configuration indication 1404 from a neighboring base station 112, and sends the CSI-RS configuration indication 1404 to the UE. Thereafter, the UE 120 detects SS blocks 1410 transmitted by the neighboring base station 112, and CSI-RS 1460 transmissions according to the CSI-RS configuration indication 1405.

Figure 15:
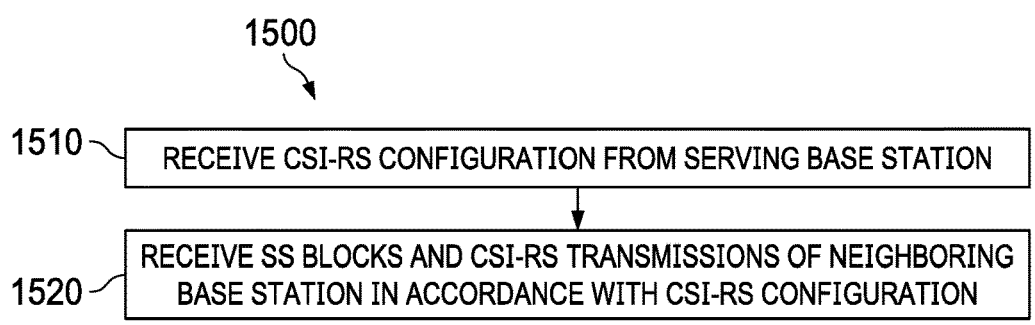
FIG. 15 is a flowchart of an embodiment beam-tracking method.

FIG. 15 is a flowchart of an embodiment method 1500 for dynamically configuring CSI-RS antenna ports, as may be performed by a UE. At step 1510, the UE receives a CSI-RS configuration indication from a serving base station. At step 1520, the UE receives SS blocks and CSI-RS transmissions of a neighboring base station in accordance with the CSI-RS configuration.

Figure 16:
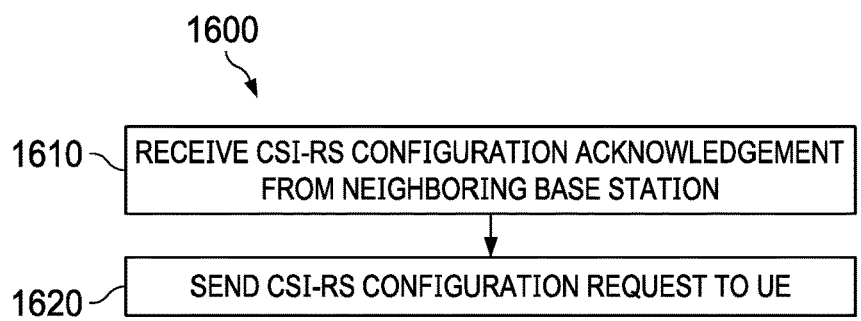
FIG. 16 is a flowchart of an embodiment beam-tracking method.

FIG. 16 is a flowchart of an embodiment method 1600 for dynamically configuring CSI-RS antenna ports, as may be performed by a serving base station. At step 1610, the serving base station receives a CSI-RS configuration indication from a neighboring base station. At step 1620, the serving base station sends the CSI-RS configuration indication to the UE, thereby triggering the UE to monitor one or more downlink channels for beamformed CSI-RSs of the neighboring base station in accordance with CSI-RS antenna ports.

In modern wireless networks, downlink (DL) based radio resource management (RRM) measurements at a user equipment (UE) in a connected mode may be used for layer-3 (L3) mobility. L3 mobility may allow a UE to roam through different networks without losing its IP address and sessions. Specifically, reference signal received power (RSRP) of a synchronization signal (SS) block or a channel state information reference signal (CSI-RS) in a connected mode may be utilized for L3 mobility. However, time synchronization reference of a CSI-RS, or the frame/slot/symbol timing of a cell may be difficult to determine for L3 mobility.

Disclosed herein is a method and system for communicating CSI-RS signals for L3 mobility in a new radio (NR) network, which may also be known as a 5G network. For example, one or more SS blocks may be transmitted by a cell to a UE according to one or more beam directions available to the cell. Each beam direction may correspond to one or more antenna ports, and each of the one or more SS blocks may correspond to an SS index. A CSI-RS signal configured according to the one or more antenna ports of the one or more beam directions and the one or more SS blocks may then be transmitted by the cell to the UE. In a different embodiment, the cell may select antenna ports for a neighbor cell for the CSI-RS signal, and the antenna ports of the neighbor cell may be selected based on a channel state measurement report received from the UE or CSI-RS configuration information received from the neighbor cell. It is noted that even though the CSI-RS signal design for L3 mobility in an NR network is described herein as a preferred embodiment, the teachings described in the present disclosure may also be applied in other applications.

In an embodiment CSI-RS communication scheme, four SS blocks and a CSI-RS signal are transmitted by a cell according to four beam directions available to the cell and corresponding antenna ports. Each SS block may comprise a primary synchronization signal (PSS) symbol, a secondary synchronization signal (SSS) symbol, and/or physical broadcast channel (PBCH) symbols. Since the four SS blocks are transmitted using different TRPs/beams through beam sweeping, the UE may only detect one or more SS blocks in its favorable beam(s). Although the UE may not be aware of which CSI-RS signals, of the CSI-RS signals in a beam sweeping configuration, the UE should measure, the UE may advantageously use the detected SS block to facilitate detection of the CSI-RS signal(s).

In embodiments of the present disclosure, an SS block may comprise a cell ID for time reference of a CSI-RS, such as in the PSS symbol and/or the SSS symbol. The PBCH symbols may comprise a timing index for the frame timing. Further embodiments of the present disclosure relate to methods for the UE to determine, based on the detected SS block(s), the CSI-RS signal(s) for measurement.

Figure 17A:
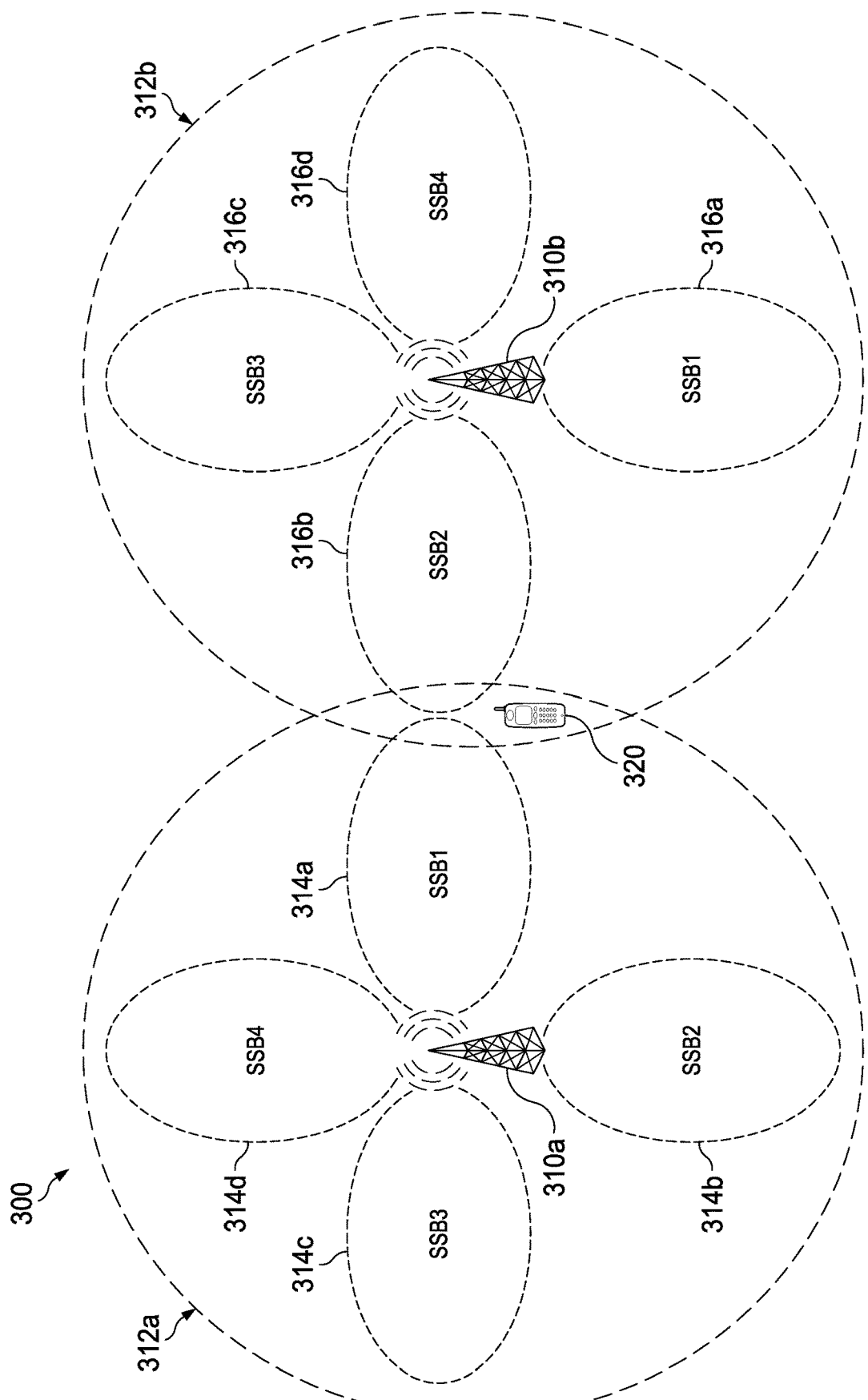
FIGS. 17A-17B are diagrams of another embodiment communication networks.
Figure 17B:
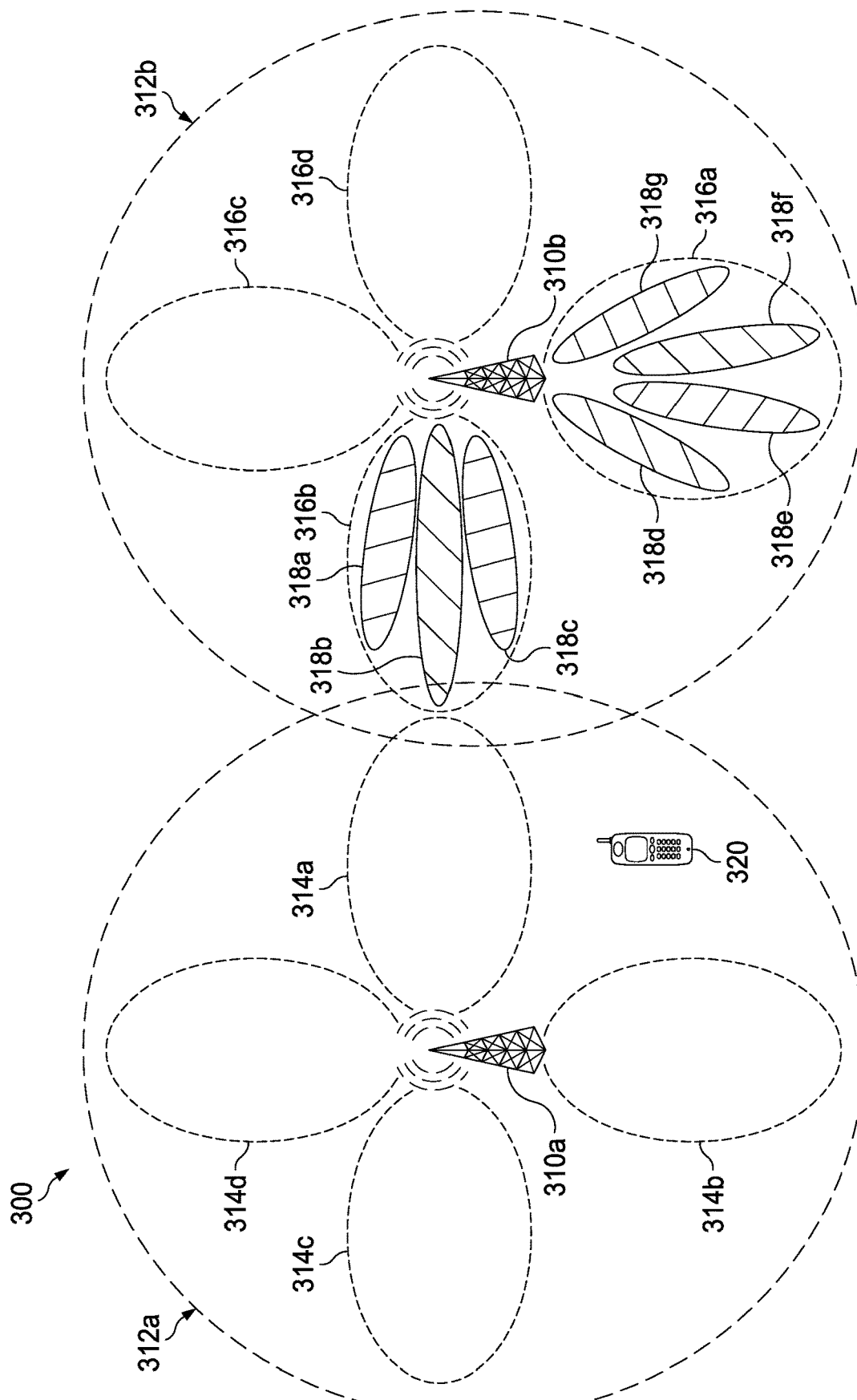

FIGS. 17A and 16B illustrate a network 1700 for communicating data. A UE 1720 roams from a coverage area 1712a supported by an NR cell 1710a to a coverage area 1712b supported by an NR cell 1710b. The NR cell 1710a as a current serving cell of the UE 1720 is called a source cell, and the NR cell 1710b is a neighbor cell. The neighbor cell 1710b is in a neighborhood of the source cell 1710a and/or the UE 1720. In this example, the source cell 1710a comprises four beam directions 1714a-1714d, and the neighbor cell 1710b comprises four beam directions 1716a-1716d. It is noted that even though both the source cell 1710a and the neighbor cell mob are shown to have four beam directions, they may comprise a number of beam directions other than four, and may comprise different numbers of beam directions. Each beam direction may correspond to one or more antenna ports. For example, as shown in FIG. 17B, the beam direction 1716b may correspond to antenna ports 1718a-1718c, and the beam direction 1716a may correspond to antenna ports 1718d-1718g. The antenna ports 1718a-1718g may be physical antenna ports or virtual antenna ports.

Figure 18:
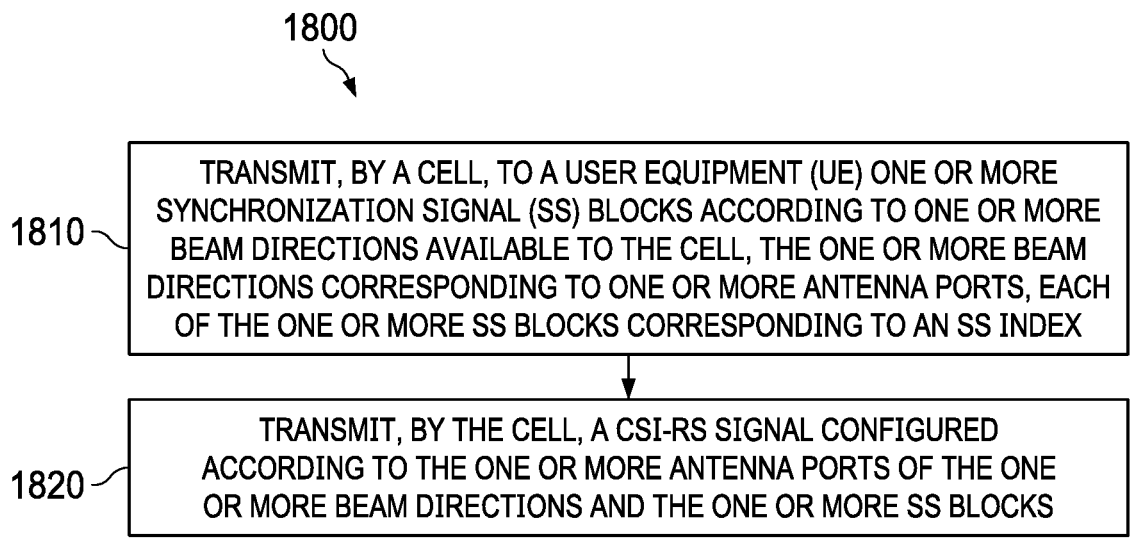
FIG. 18 illustrates an embodiment method for communicating CSI-RS.

FIG. 18 illustrates an embodiment method 1800 for communicating CSI-RS in a communication network. As shown, the method 1800 begins at step 1810 where a cell transmits to a UE one or more SS blocks according to one or more beam directions available to the cell. For example, as shown in FIG. 17A, the source cell 1710a may transmit to the UE 1720 four SS blocks according to its four beam directions 1714a-1714d, and the neighbor cell mob may transmit to the UE 1720 four SS blocks according to its four beam directions 1716a-1716d. Each of the one or more SS blocks may correspond to an SS index. Thereafter, the method 1800 proceeds to step 1820, where the cell transmits a CSI-RS signal configured according to the one or more antenna ports of the one or more beam directions and the one or more SS blocks. For example, in a beam sweeping configuration, the CSI-RS signal may correspond to multiple antenna ports and/or beam directions. For instance, A CSI-RS signal transmitted by the neighbor cell 1712b may be configured according to the antenna ports 1718a-1718g. The beam sweeping may be based on all beam directions available to the cell or only a subset of the beam directions available to the cell. Likewise, the beam sweeping may be based on all antenna ports available to the cell or only a subset of the antenna ports available to the cell.

An SS block may be mapped to a CSI-RS antenna port when the CSI-RS signal is transmitted using the same beam direction as the SS block, or when the antenna port of the CSI-RS signal and the SS block are in a quasi co-location (QCL) relation. For example an SS block corresponding to the beam direction 1716b may be mapped to the antenna port 1718a when the CSI-RS signal is transmitted using the antenna port 1718a. Alternatively, the SS block corresponding to the beam direction 1716b may be mapped to the antenna port 1718a when the antenna port 1718a and the beam direction 1716b is in a QCL relation according to the UE 1720 even if the antenna port 1718a does not correspond to the beam direction 1716b. While a beam direction may correspond to one or more antenna ports, an SS block may be mapped to one or multiple CSI-RS antenna ports. The mapping of SS blocks with antenna ports may either be a priori knowledge to the UE or transmitted to the UE via higher layer signaling. For example, the mapping of SS blocks with antenna ports may be configured as default in terms of number of antenna ports or QCL assumption, or transmitted to the UE via radio resource control (RRC) signaling. Alternatively, no default or signaled relation between CSI-RS ports and SS blocks may be assumed. CSI-RS configuration may comprise information that allocates a set of time-frequency resources within a certain bandwidth with some predefined periodicity that are filled with known sequences mapped to predefined patterns. CSI-RS configuration information may also be signaled by the cell to the UE such as through RRC signaling.

Figure 19:
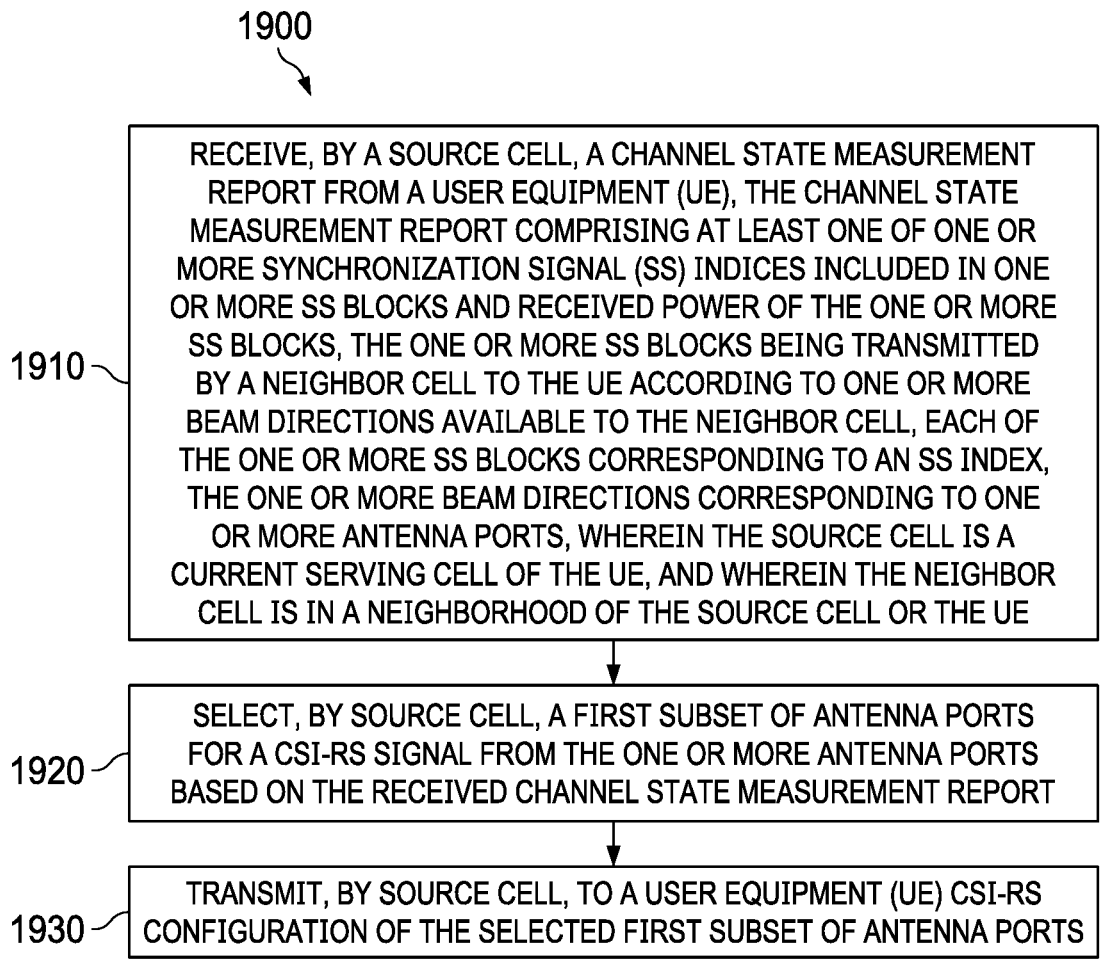
FIG. 19 illustrates another embodiment method for communicating CSI-RS.

FIG. 19 illustrates another embodiment method 1900 for communicating CSI-RS in a communication network. As shown, the method 1900 begins at step 1910, where a source cell receives a channel state measurement report from a user equipment (UE). The channel state measurement report may comprise channel state measurements or channel performance of different antenna ports or beam directions of a neighbor cell. For example, the channel state measurement report may comprise at least one of one or more synchronization signal (SS) indices included in one or more SS blocks and received power (e.g., reference signal received power (RSRP)) of the one or more SS blocks. The one or more SS blocks may be transmitted by the neighbor cell to the UE according to one or more beam directions available to the neighbor cell. The UE may perform channel state measurements of the neighbor cell based on the received SS blocks, and transmit the channel state measurement report to the source cell.

In an embodiment, in response to the transmission of the channel state measurement report from the UE to the source cell, the source cell communicates with the neighbor cell in order to select antenna ports for a CSI-RS signal. For example, the source cell may forward to the neighbor cell the channel state measurement report received from the UE.

In another embodiment, independently of the transmission of the channel state measurement report from the UE to the source cell, the source cell and the neighbor cell periodically or occasionally communicate CSI-RS configuration information. For example, the neighbor cell may pre-emptively allocate some CSI-RS ports and informs the source cell of its CSI-RS configuration.

Thereafter, the method 1900 proceeds to step 1920, where the source cell selects a first subset of antenna ports for the CSI-RS signal from the one or more antenna ports based on the received channel state measurement report. The source cell may select the first subset of antenna ports based on feedback from the neighbor cell after forwarding the channel state measurement report to the neighbor cell. Alternatively, the source cell may select the first subset of antenna ports based on pre-emptively allocated CSI-RS ports and the channel state measurement report. The source cell may also receive from the neighbor cell other CSI-RS configuration information such as a mapping between the SS blocks and the one or more antenna ports.

Subsequently, the method 1900 proceeds to step 190, where the source cell transmits to the UE the CSI-RS configuration of the selected first subset of antenna ports.

In some embodiments, upon completion of the method 1900, the UE can more readily measure the CSI-RS signal from the neighbor cell based on the received CSI-RS configuration.

The source cell may receive from the neighbor cell information on a second subset of the one or more antenna ports for the CSI-RS signal, and the source cell may select the first subset of antenna ports based on the second subset of the antenna ports and/or the channel state measurement report received from the UE. In an embodiment, the source cell may forward information on the second subset of antenna ports to the UE, and the UE may perform the channel state measurements of the second subset of antenna ports only. The channel state measurement report may comprise channel state measurements on the second subset of antenna ports only.

In this case, the first subset of antenna ports may be a subset of the second set of antenna ports. For example, some CSI-RS antenna ports in the neighbor cell may be configured for CSI acquisition and beam management, and a subset of such antenna ports, such as the second subset of the antenna ports, may be configured to be reused for L3 mobility. The source cell may signal to the UE an assignment of the first subset of antenna ports for the CSI-RS signal, e.g., through a radio resource control (RRC) message or a media access control (MAC) message. For example, as shown in FIG. 17B, antenna ports 1718a-1718c of the neighbor cell 1710b may be selected as the first subset of antenna ports by the source cell 1710a, and signaled to the UE 1720 with the cell ID of the neighbor cell 1710b.

The source cell 1710a may also forward to the UE 1720 CSI-RS configuration information originally received from the neighbor cell 1710b. The neighbor cell 1710b may transmit CSI-RS configuration information to the source cell 1710a periodically, or upon a request from the source cell 1710a. The CSI-RS configuration information may include a mapping between the SS blocks and the one or more antenna ports.

A numerology of a CSI-RS signal may be based on a predefined relation with a numerology of CSI acquisition, beam management, or an SS block for a specific frequency range. A numerology may comprise subcarrier spacing (SCS), cyclic prefix (CP) length of orthogonal frequency division multiplexing (OFDM) symbols, and the like. For example, the numerology of the CSI-RS signal may be the same as the numerology of CSI acquisition, beam management, or an SS block for a specific frequency range. Specifically, if CSI-RS for acquisition and/or beam management is configured with 60 kHz subcarrier spacing and normal CP, the CSI-RS for L3 mobility may be configured with the same subcarrier spacing and CP. If in 2 GHz carrier frequency, an SS block is transmitted using 15 kHz SCS and normal CP (e.g., default numerology for 2 GHz carrier frequency), CSI-RS for L3 mobility may be transmitted using 15 kHz SCS and normal CP. Alternatively, a parameter of the numerology of the CSI-RS signal may be a predefined number of times of a corresponding parameter of the numerology of CSI acquisition, beam management, or an SS block for a specific frequency range. For instance, SCS for the CSI-RS signal for L3 mobility may be N times that of the default SCS of an SS block for the particular frequency range. Take N=4 as an example, if the default SCS of an SS block is 15 kHz, the SCS for CSI-RS for L3 mobility may be 60 kHz.

Lower accuracy for the neighbor cell CSI-RS measurement compared to the CSI-RS measurement for the serving cell may suffice for L3 mobility. The CSI-RS bandwidth for L3 mobility may be configurable and have a minimum bandwidth larger than an SS block to provide a more accurate RSRP measurement than an SS-based RSRP. The CSI measurement quality for L3 mobility may or might not exceed that of the CSI acquisition. That is to say, the CSI measurement for L3 mobility may use at most the same density and number of antenna ports as CSI acquisition. For example, if the maximum number of supported antenna ports for CSI-RS for CSI acquisition is equal to or larger than eight ports with the density of at least 1 RE/RB/port or ½ RE/RB/port, the maximum number of antenna ports for CSI-RS for L3 mobility may be eight with the density of 1 RE/RB/port or ½ RE/RB/port. In fact, lower density values such as d=¼ RE/RB/port may be beneficial for L3 mobility, such as to reduce overhead.

Figure 20:
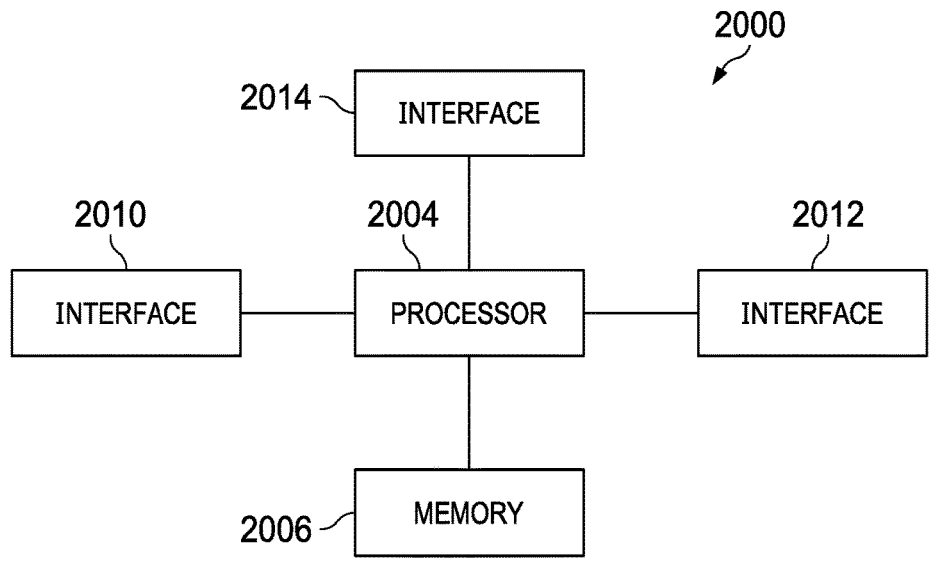
FIG. 20 is a diagram of an embodiment processing system.

FIG. 20 illustrates a block diagram of an embodiment processing system 2000 for performing methods described herein, which may be installed in a host device. As shown, the processing system 2000 includes a processor 2004, a memory 2006, and interfaces 2010-2014, which may (or may not) be arranged as shown in FIG. 20. The processor 2004 may be any component or collection of components adapted to perform computations and/or other processing related tasks, and the memory 2006 may be any component or collection of components adapted to store programming and/or instructions for execution by the processor 2004. In an embodiment, the memory 2006 includes a non-transitory computer readable medium. The interfaces 2010, 2012, 2014 may be any component or collection of components that allow the processing system 2000 to communicate with other devices/components and/or a user. For example, one or more of the interfaces 2010, 2012, 2014 may be adapted to communicate data, control, or management messages from the processor 2004 to applications installed on the host device and/or a remote device. As another example, one or more of the interfaces 2010, 2012, 2014 may be adapted to allow a user or user device (e.g., personal computer (PC), etc.) to interact/communicate with the processing system 2000. The processing system 2000 may include additional components not depicted in FIG. 20, such as long term storage (e.g., non-volatile memory, etc.).

In some embodiments, the processing system 2000 is included in a network device that is accessing, or part otherwise of, a telecommunications network. In one example, the processing system 2000 is in a network-side device in a wireless or wireline telecommunications network, such as a base station, a relay station, a scheduler, a controller, a gateway, a router, an applications server, or any other device in the telecommunications network. In other embodiments, the processing system 2000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 21:
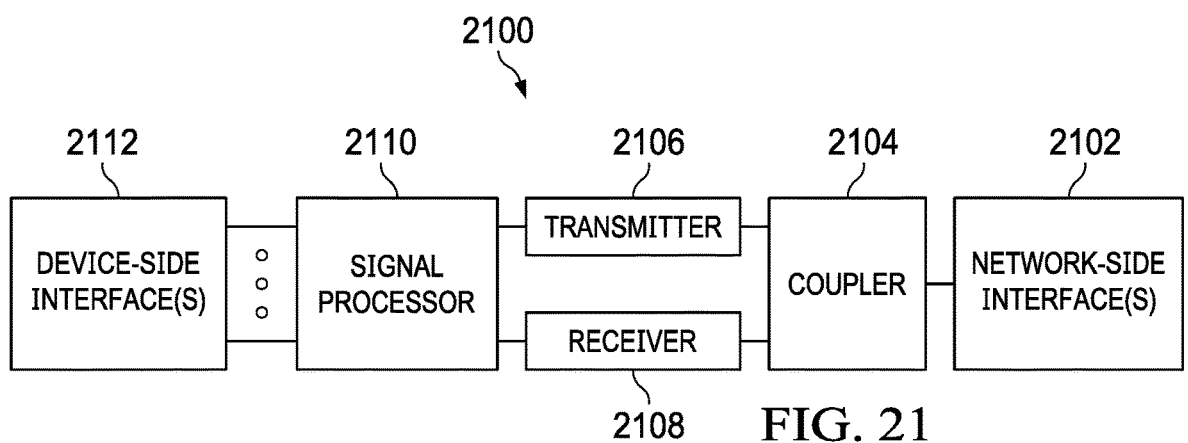
FIG. 21 is a diagram of an embodiment transceiver.

In some embodiments, one or more of the interfaces 2010, 2012, 2014 connects the processing system 2000 to a transceiver adapted to transmit and receive signaling over the telecommunications network. FIG. 21 illustrates a block diagram of a transceiver 2100 adapted to transmit and receive signaling over a telecommunications network. The transceiver 2100 may be installed in a host device. As shown, the transceiver 2100 comprises a network-side interface 2102, a coupler 2104, a transmitter 2106, a receiver 2108, a signal processor 2110, and a device-side interface 2112. The network-side interface 2102 may include any component or collection of components adapted to transmit or receive signaling over a wireless or wireline telecommunications network. The coupler 2104 may include any component or collection of components adapted to facilitate bi-directional communication over the network-side interface 2102. The transmitter 2106 may include any component or collection of components (e.g., up-converter, power amplifier, etc.) adapted to convert a baseband signal into a modulated carrier signal suitable for transmission over the network-side interface 2102. The receiver 2108 may include any component or collection of components (e.g., down-converter, low noise amplifier, etc.) adapted to convert a carrier signal received over the network-side interface 2102 into a baseband signal. The signal processor 2110 may include any component or collection of components adapted to convert a baseband signal into a data signal suitable for communication over the device-side interface(s) 2112, or vice-versa. The device-side interface(s) 2112 may include any component or collection of components adapted to communicate data-signals between the signal processor 2110 and components within the host device (e.g., the processing system 600, local area network (LAN) ports, etc.).

The transceiver 2100 may transmit and receive signaling over any type of communications medium. In some embodiments, the transceiver 2100 transmits and receives signaling over a wireless medium. For example, the transceiver 2100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2102 comprises one or more antenna/radiating elements. For example, the network-side interface 2102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed is:

1. A method for communicating a channel state information reference signal (CSI-RS) in a communication network, the method comprising:
  receiving, by a user equipment (UE) from a serving base station, one or more control signals indicating a CSI-RS configuration of a neighboring base station and a quasi-co-located (QCL) relationship between CSI-RS antenna ports of the neighboring base station and synchronization signal (SS) antenna ports of the neighboring base station;
  receiving, by the UE, SS blocks from the neighboring base station over resources mapped to the SS antenna ports of the neighboring base station;
  selecting, by the UE, a subset of the CSI-RS antenna ports of the neighboring base station based on a received signal quality of the SS blocks and the QCL relationship between the CSI-RS antenna ports of the neighboring base station and the SS antenna ports of the neighboring base station; and
  receiving, by the UE, the CSI-RS from the neighboring base station over the subset of the CSI-RS antenna ports based on the CSI-RS configuration of the neighboring base station.

2. The method of claim 1, wherein the subset of CSI-RS antenna ports of the neighboring base station comprises fewer than all CSI-RS antenna ports of the neighboring base station.

3. The method of claim 1, wherein the receiving the one or more control signals indicating the CSI-RS configuration of the neighboring base station is prior to receiving the one or more SS blocks from the neighboring base station.

4. The method of claim 1, further comprising:
  sending, by the UE, a request for the CSI-RS configuration of the neighboring base station to the serving base station after receiving the one or more SS blocks from the neighboring base station, the indication of the CSI-RS configuration of the neighboring base station being received in response to the request for the CSI-RS configuration of the neighboring base station.

5. The method of claim 1, wherein the one or more control signals indicating the CSI-RS configuration of the neighboring base station is received in a radio resource configuration (RRC) message.

6. The method of claim 1, wherein each of the SS blocks is mapped to one or more CSI-RS antenna ports.

7. A user equipment (UE) comprising:
  a processor; and
  a non-transitory computer readable storage medium storing programming for execution by the processor, the programming including instructions to:
    receive, from a serving base station, one or more control signals indicating a CSI-RS configuration of a neighboring base station and a quasi-co-located (QCL) relationship between CSI-RS antenna ports of the neighboring base station and synchronization signal (SS) antenna ports of the neighboring base station
    receive SS blocks from the neighboring base station over resources mapped to the SS antenna ports of the neighboring base station;
    select a subset of the CSI-RS antenna ports of the neighboring base station based on a received signal quality of the SS blocks and the QCL relationship between the CSI-RS antenna ports of the neighboring base station and the SS antenna ports of the neighboring base station; and
    receive a CSI-RS from the neighboring base station over the subset of the CSI-RS antenna ports based on the CSI-RS configuration of the neighboring base station.

8. The UE of claim 7, wherein the subset of CSI-RS antenna ports of the neighboring base station comprises fewer than all CSI-RS antenna ports of the neighboring base station.

9. The UE of claim 7, wherein the UE receives the one or more control signals indicating the CSI-RS configuration of the neighboring base station prior to receiving the one or more SS blocks from the neighboring base station.

10. The UE of claim 7, wherein the programming further include instructions to:
send a request for the CSI-RS configuration of the neighboring base station to the serving base station after receiving the one or more SS blocks from the neighboring base station, the indication of the CSI-RS configuration of the neighboring base station being received in response to the request for the CSI-RS configuration of the neighboring base station.

11. The UE of claim 7, wherein the one or more control signals indicating the CSI-RS configuration of the neighboring base station is received in a radio resource configuration (RRC) message.

12. The UE of claim 7, wherein each of the SS blocks is mapped to one or more CSI-RS antenna ports.

13. A non-transitory computer-readable medium storing computer instructions, that when executed by one or more processors of a user equipment (UE), cause the UE to perform the steps of:
receiving, from a serving base station, one or more control signals indicating a CSI-RS configuration of a neighboring base station and a quasi-co-located (QCL) relationship between CSI-RS antenna ports of the neighboring base station and synchronization signal (SS) antenna ports of the neighboring base station
receiving SS blocks from the neighboring base station over resources mapped to the SS antenna ports of the neighboring base station;
selecting a subset of the CSI-RS antenna ports of the neighboring base station based on a received signal quality of the SS blocks and the QCL relationship between the CSI-RS antenna ports of the neighboring base station and the SS antenna ports of the neighboring base station; and
receiving a CSI-RS from the neighboring base station over the subset of the CSI-RS antenna ports based on the CSI-RS configuration of the neighboring base station.

14. The non-transitory computer-readable medium of claim 13, wherein the subset of CSI-RS antenna ports of the neighboring base station comprises fewer than all CSI-RS antenna ports of the neighboring base station.

15. The non-transitory computer-readable medium of claim 13, wherein receiving the one or more control signals indicating the CSI-RS configuration of the neighboring base station is prior to receiving the one or more SS blocks from the neighboring base station.

16. The non-transitory computer-readable medium of claim 13, wherein the one or more processors are caused to perform the step of sending a request for the CSI-RS configuration of the neighboring base station to the serving base station after receiving the one or more SS blocks from the neighboring base station, the indication of the CSI-RS configuration of the neighboring base station being received in response to the request for the CSI-RS configuration of the neighboring base station.

17. The non-transitory computer-readable medium of claim 13, wherein the one or more control signals indicating the CSI-RS configuration of the neighboring base station is received in a radio resource configuration (RRC) message.

18. The non-transitory computer-readable medium of claim 13, wherein each of the SS blocks is mapped to one or more CSI-RS antenna ports.

* * * * *